UNITED STATES PATENT OFFICE.

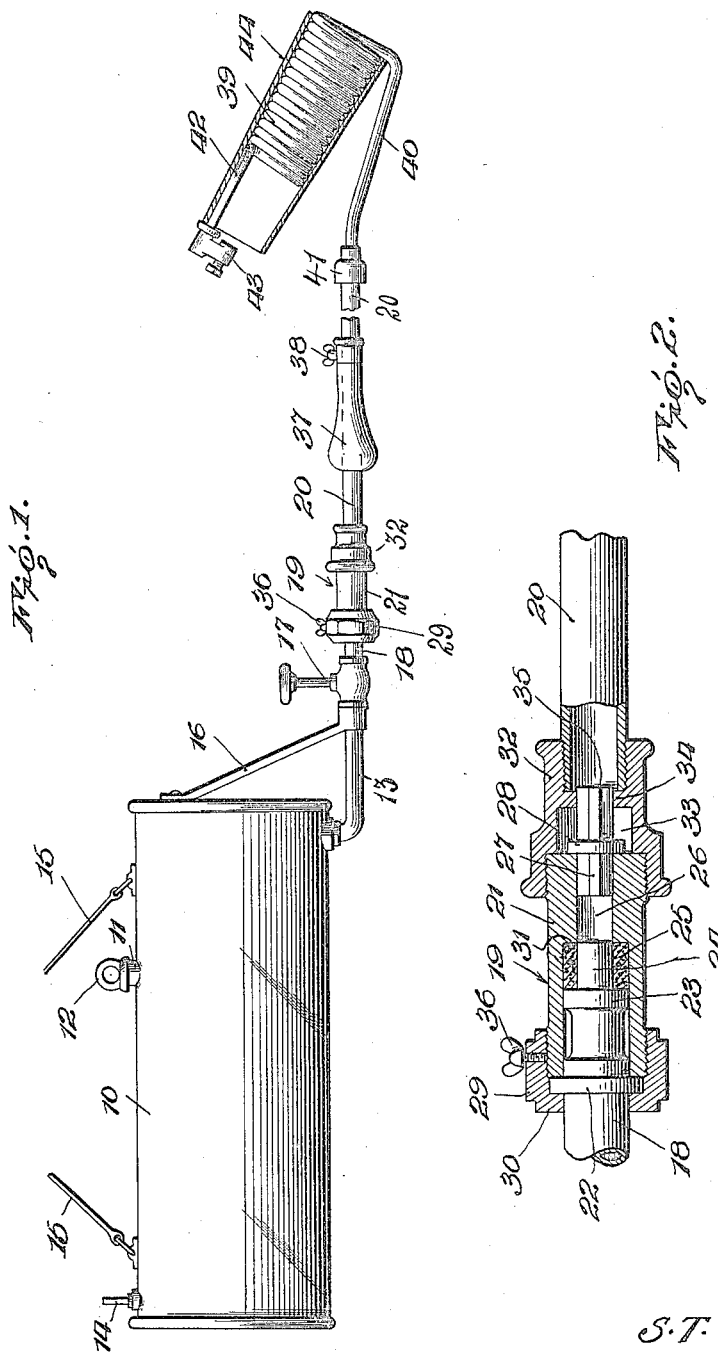

SAMUEL T. TAYLOR, OF SAN SABA, TEXAS.

TORCH OR BURNER.

1,231,969.   Specification of Letters Patent.   Patented July 3, 1917.

Application filed March 12, 1917.   Serial No. 154,273.

*To all whom it may concern:*

Be it known that I, SAMUEL T. TAYLOR, a citizen of the United States, residing at San Saba, in the county of San Saba and State of Texas, have invented certain new and useful Improvements in Torches or Burners, of which the following is a specification.

This invention relates to devices including a burner or torch whereby extraneous growths may be burned from plants of various kinds, or from the ground around the roots of plants, or in places which are otherwise inaccessible to ordinary weed and growth destroying implements, such as hoes, cultivators, and the like, and has for one of its objects to provide a simply constructed device which may be carried from place to place, and in which some form of hydrocarbon liquid, such as crude kerosene oil, or the like, is employed as a fuel, and which may be readily adjusted to direct the flame of the torch or burner in any required direction.
Another object of the invention is to provide a device of this character including a reservoir for the liquid fuel in which air under pressure is employed as a medium for forcing the fuel to the burner.
With these and other objects in view, the invention consists in certain novel features of construction, as hereinafter shown and described and then specifically pointed out in the claims; and in the drawings illustrative of the preferred embodiment of the invention—

Figure 1 is a side elevation partly in section of the improved device.

Fig. 2 is an enlarged longitudinal section of the swivel coupling member between the torch and the supply tank.

The improved device includes a tank or reservoir represented as a whole at 10, and provided with an intake socket 11, having a suitable air-tight closure 12 and with an outlet tube 13. The tank 10 is likewise provided with a suitable nipple represented at 14, adapted to receive a supply pipe for a compressed air device, for instance the ordinary pump employed for inflating automobile tires. The means for producing the air pressure is not shown as it forms no part of the present invention. The tank 10 will be of a size adapted to be carried by a person who is to use the torch, and is provided with suitable suspension straps, portions of which are indicated at 15, to bear over the shoulders of the operator, who is thus enabled to carry the tank 10 beneath one of his arms. The outlet member 13 together with its connection and attachments will be about three feet long, but may be lengthened or shortened as required. The outlet or the discharge from the tank is formed of a plurality of members, and includes the initial section 13 which is supported from the tank 10 by a suitable brace 16. A controlling valve 17 is connected to the initial section 13 and from which a nipple member 18 extends and forms a part of a swivel coupling represented as a whole at 19 in Figs. 1 and 2. Leading from the swivel coupling is the outer section 20 of the outlet from the tank and to the outer end of which a burner or torch device is coupled, as hereafter explained. The swivel coupling is shown in detail in Fig. 2, and comprises a cylindrical body 21 bearing at one end against a stop collar 22 integral with the nipple device 18, the collar being located intermediate the ends of the nipple device so that a portion of the nipple extends into the interior of the body 21 as shown at 23. The portion 23 of the nipple device is reduced as shown at 24, and the reduced portion surrounded by a suitable packing indicated at 25. The body portion 21 is reduced at one end to form a guideway represented at 26, for one of the wing portions 27 of a valve 28. A sleeve member 29 is threaded upon the body 21 and provided with a flange 30 to engage the stop collar 22 at the side opposite to the member 21. By this means the member 21 is mounted for rotation upon the nipple device 18—23. The member 21 is formed with an internal shoulder 31 which bears against the packing 25 and thus insures an oil and air tight joint between the parts 21 and 18—23.

Threaded upon the outer end of the member 21 is another sleeve represented as a whole at 32 and provided with an internal cavity 33 in which the valve 28 operates and with an annular guide 34 through which the outer winged portion 35 of the valve 28 operates. The section 20 of the oil duct is threaded into the sleeve 32 as shown in Fig. 2. By this means the oil is free to pass from the tank 10 into the section 20 of the conduit when the valve 17 is opened, by displacing the valve 28, but the valve 28 operates to prevent any return movement of the oil. The member 19 thsu serves the twofold purpose of a swivel coupling to enable the outer conduit section 20 and its attachments to be rotated, and also as an outwardly opening check valve. The collar 29 is provided with a set screw 36 so that the swivel member may be held from rotation when required.

A hand grip 37 is slidably disposed upon the section 20 of the conduit and provided with a set screw 38 so that the hand grip may be rigidly coupled to the section 20. By this means the hand grip may be adjusted to correspond to the "arm reach" of the operator.

The torch or burner portion of the improved device comprises a supply pipe formed into a plurality of closely arranged coils 39 and extended at one end as shown at 40, and coupled to the outer end of the section 20 of the conduit by a collar 41. The pipes forming the coil 39 and the extension 40 are considerably smaller in diameter than the conduit 13—20, hence the collar 41 will be of the reducing form as shown. At the end opposite to the extension 40 the burner pipe is extended as shown at 42, and terminates in a jet device 43 with its discharge toward the interior of the coil 39. The coil is preferably somewhat conical, or larger at the end from which the extension 40 projects than at the opposite end, and the terminal helix at the smaller end of the coil is spaced a considerable distance from the jet member 43.

Surrounding the coil 39 and the extension 42 is a plate metal casing 44 which forms the air induct of the burner.

In operating the improved device a small quantity of oil is permitted to escape from the tank through the conduit by opening the valve 17 slightly and when a small quantity has flowed through the jet 43 it is lighted and burns within the casing 44 and in contact with the coils and thus heats the latter and vaporizes the oil as it passes through so that in a short time all of the oil is vaporized as it passes through the coils and escapes from the jet in that condition and mingling with the air flowing through the casing 44 burns fiercely and produces a very intensely hot flame issuing from the larger end of the coil. By actuating the valve 17 the supply of oil can be controlled to correspondingly control the intensity of the flame.

The casing 44 and the coil inclosed therein are arranged concentric to the longitudinal axis of the coil and casing and oblique to the longitudinal axis of the conduit 13—20, and by rotating the portion 20 of the conduit by force applied to the hand grip 37, the force of the flame can be turned in any direction required.

The improved implement may be employed for a variety of purposes, but is designed more particularly for the burning off superflous growths from plants, and is more particularly designed to burn the thorns from prickly pears, so that this fruit can be employed for stock feeding. The device will also be found very useful in burning grass and other growth from fence corners, along walks and similar localities. The implement may also be employed for singeing hedges and the like.

Any required pressure may be applied to the tank 10 above the oil therein, but generally from 25 to 85 pounds will be found sufficient, the air pressure causing the oil to flow with the required force through the conduits and into the burner.

Having thus described the invention, what is claimed as new is—

1. In a device of the class described a rotatable conduit for liquid fuel, a burner comprising a tapered shell with its longitudinal axis oblique to the longitudinal axis of the conduit, and a tapered coil of piping within the shell with its coils concentric thereto and engaging the inner walls of the same, said coil being connected at one end to the conduit and terminating at the other end in a discharge jet directed toward the interior of the coil.

2. In a device of the class described a rotatable conduit for liquid fuel, a burner comprising a tapered shell with its longitudinal axis oblique to the longitudinal axis of the conduit, and a tapered coil of piping within the shell with its coils concentric thereto and engaging the inner walls of the same, said coil being spaced at its smaller end from the smaller end of the shell and connected at its larger end to the conduit and terminating in advance of its smaller end in a discharge jet directed toward the interior of the coil.

In testimony whereof I affix my signature.

SAMUEL T. TAYLOR. [L. S.]

Copies of this patent may be obtained for five cents each, by addressing the "Commissioner of Patents, Washington, D. C."